United States Patent
Zhu et al.

(10) Patent No.: US 11,889,318 B2
(45) Date of Patent: *Jan. 30, 2024

(54) METHOD AND SYSTEM FOR SUPPORTING VOICE CALLS IN 5G NEW RADIO ENVIRONMENTS

(71) Applicant: Verizon Patent and Licensing Inc., Basking Ridge, NJ (US)

(72) Inventors: Lily Zhu, Parsippany, NJ (US); Ratul Kumar Guha, Kendall Park, NJ (US); Jignesh S. Panchal, Hillsborough, NJ (US); Balaji L. Raghavachari, Bridgewater, NJ (US); Niranjan B. Avula, Frisco, TX (US); Timothy M. Dwight, Richardson, TX (US); Sudhakar Reddy Patil, Flower Mound, TX (US); Imtiyaz Shaikh, Irving, TX (US); Kalyani Bogineni, Hillsborough, NJ (US); Andrew E. Youtz, Princeton, NJ (US); Xin Wang, Morris Plains, NJ (US); Sagiv Draznin, Walnut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 82 days.

This patent is subject to a terminal disclaimer.

(21) Appl. No.: 17/532,406

(22) Filed: Nov. 22, 2021

(65) Prior Publication Data

US 2022/0086656 A1     Mar. 17, 2022

Related U.S. Application Data

(63) Continuation of application No. 16/862,609, filed on Apr. 30, 2020, now Pat. No. 11,206,548, which is a
(Continued)

(51) Int. Cl.
*H04W 4/00*     (2018.01)
*H04W 16/14*     (2009.01)
(Continued)

(52) U.S. Cl.
CPC .......... *H04W 16/14* (2013.01); *H04W 48/10* (2013.01); *H04W 68/005* (2013.01)

(58) Field of Classification Search
CPC ... H04W 16/14; H04W 48/10; H04W 68/005; H04W 48/02; H04W 76/27; H04W 76/16;
(Continued)

(56) References Cited

U.S. PATENT DOCUMENTS 5,548,809 A * 8/1996 Lemson ............... H04B 7/0837
455/454
6,751,472 B1 6/2004 Muhonen
(Continued)

FOREIGN PATENT DOCUMENTS

EP     3100488 B1 * 10/2021 ........... H04B 7/0617

*Primary Examiner* — Stephen M D Agosta

(57) ABSTRACT

Systems and methods provide reliable voice connections dual-connectivity environments, given limitations of available spectrum. A system includes a first wireless station and a second wireless station. The first wireless station provides a shared spectrum of a first frequency band, the shared spectrum including a first spectrum for a first cellular wireless standard and a second spectrum for a second cellular wireless standard. The second wireless station is at least partially within a coverage area of the first wireless station and provides a third spectrum for the second cellular wireless standard. The third spectrum is a millimeter wave (mmWave) spectrum. The first wireless station broadcasts a parameter barring an end device in an idle mode from camping on the second spectrum. The first wireless station
(Continued)

or the second wireless station triggers the end device to swap to the second spectrum when a paging request for a voice call is received.

20 Claims, 11 Drawing Sheets

Related U.S. Application Data continuation of application No. 16/031,332, filed on Jul. 10, 2018, now Pat. No. 10,681,559.

(60) Provisional application No. 62/691,981, filed on Jun. 29, 2018.

(51) Int. Cl.
*H04W 68/00* (2009.01)
*H04W 48/10* (2009.01)

(58) Field of Classification Search
CPC . H04W 36/0022; H04W 48/16; H04W 48/18; H04W 88/06; H04M 2207/18; H04M 2207/20; H04M 3/42314; H04B 7/0413; H04B 7/0617; H04B 7/0623; H04L 1/0061; H04L 1/0072; H04L 1/1812; H04J 3/0688
See application file for complete search history.

(56) References Cited

U.S. PATENT DOCUMENTS

| | | | | |
|---|---|---|---|---|
| 6,792,284 | B1* | 9/2004 | Dalsgaard | H04W 36/0094 455/436 |
| 8,285,289 | B2* | 10/2012 | Mooney | H04W 36/0016 455/552.1 |
| 8,478,286 | B1* | 7/2013 | Fan | H04W 48/02 455/410 |
| 9,357,461 | B2 | 5/2016 | Jung et al. | |
| 9,380,594 | B1* | 6/2016 | Malmirchegini | H04W 24/08 |
| 9,462,443 | B2 | 10/2016 | Turina | |
| 9,585,009 | B2* | 2/2017 | Ta | H04W 12/02 |
| 2004/0240402 | A1 | 12/2004 | Stephens | |
| 2008/0032714 | A1* | 2/2008 | Suzuki | H04W 4/16 455/458 |
| 2009/0005022 | A1* | 1/2009 | Lehtiniemi | H04M 3/42042 455/415 |
| 2010/0105392 | A1* | 4/2010 | Cheng | H04W 48/16 455/437 |
| 2010/0323662 | A1* | 12/2010 | Dahlen | H04W 48/02 455/410 |
| 2010/0323693 | A1* | 12/2010 | Krishnamurthy | H04W 36/08 455/434 |
| 2011/0281580 | A1 | 11/2011 | Tonogai et al. | |
| 2012/0039171 | A1* | 2/2012 | Yamada | H04W 48/06 370/232 |
| 2012/0082051 | A1* | 4/2012 | Kim | H04W 24/10 370/252 |
| 2012/0214495 | A1 | 8/2012 | Choi et al. | |
| 2012/0307632 | A1* | 12/2012 | Guo | H04W 28/0289 370/230 |
| 2013/0122906 | A1* | 5/2013 | Klatt | H04W 72/042 455/435.1 |
| 2013/0237198 | A1 | 9/2013 | Vashi et al. | |
| 2013/0273907 | A1 | 10/2013 | Vikberg et al. | |
| 2013/0308532 | A1 | 11/2013 | Yu et al. | |
| 2014/0066082 | A1* | 3/2014 | Anchan | H04W 48/02 455/452.1 |
| 2014/0128029 | A1* | 5/2014 | Fong | H04W 48/12 455/411 |
| 2014/0141781 | A1 | 5/2014 | Park et al. | |
| 2014/0148168 | A1* | 5/2014 | Aoyagi | H04W 48/12 455/436 |
| 2014/0256318 | A1* | 9/2014 | Ekici | H04W 52/0216 455/435.1 |
| 2014/0287694 | A1 | 9/2014 | Kim et al. | |
| 2014/0321272 | A1* | 10/2014 | Bangolae | H04N 7/147 370/230 |
| 2015/0092709 | A1 | 4/2015 | Su | |
| 2015/0094065 | A1 | 4/2015 | Su et al. | |
| 2015/0119015 | A1* | 4/2015 | Gai | H04W 48/08 455/418 |
| 2015/0208414 | A1* | 7/2015 | Ji | H04W 72/0453 455/454 |
| 2015/0215077 | A1 | 7/2015 | Ratasuk et al. | |
| 2015/0256297 | A1 | 9/2015 | Yang et al. | |
| 2015/0257161 | A1* | 9/2015 | Hsu | H04W 48/02 455/453 |
| 2015/0264602 | A1 | 9/2015 | Hageltorn et al. | |
| 2016/0095008 | A1* | 3/2016 | Zhao | H04W 72/085 370/252 |
| 2016/0127913 | A1* | 5/2016 | Li | H04W 72/0453 370/329 |
| 2016/0135231 | A1* | 5/2016 | Lee | H04W 4/06 370/329 |
| 2016/0142994 | A1* | 5/2016 | Luo | H04W 56/001 370/328 |
| 2017/0195983 | A1* | 7/2017 | Chami | H04W 48/16 |
| 2017/0251518 | A1 | 8/2017 | Agiwal et al. | |
| 2017/0273058 | A1 | 9/2017 | Agiwal et al. | |
| 2017/0359747 | A1 | 12/2017 | Lunden et al. | |
| 2017/0374608 | A1 | 12/2017 | Li et al. | |
| 2018/0007563 | A1 | 1/2018 | Zhang et al. | |
| 2018/0049036 | A1* | 2/2018 | Sethi | H04W 16/14 |
| 2018/0132153 | A1 | 5/2018 | Ku et al. | |
| 2018/0139670 | A1 | 5/2018 | Shaw et al. | |
| 2018/0206214 | A1 | 7/2018 | Bendlin et al. | |
| 2018/0269962 | A1* | 9/2018 | Liu | H04W 16/24 |
| 2018/0288663 | A1 | 10/2018 | Ziren et al. | |
| 2018/0343546 | A1 | 11/2018 | Kolluri et al. | |
| 2018/0343592 | A1 | 11/2018 | Sun et al. | |
| 2019/0059102 | A1 | 2/2019 | Yerramalli et al. | |
| 2019/0110243 | A1 | 4/2019 | Chun et al. | |
| 2019/0132104 | A1 | 5/2019 | Lee et al. | |
| 2019/0174003 | A1 | 6/2019 | Chandramouli et al. | |
| 2020/0045671 | A1 | 2/2020 | Hapsari et al. | |

* cited by examiner

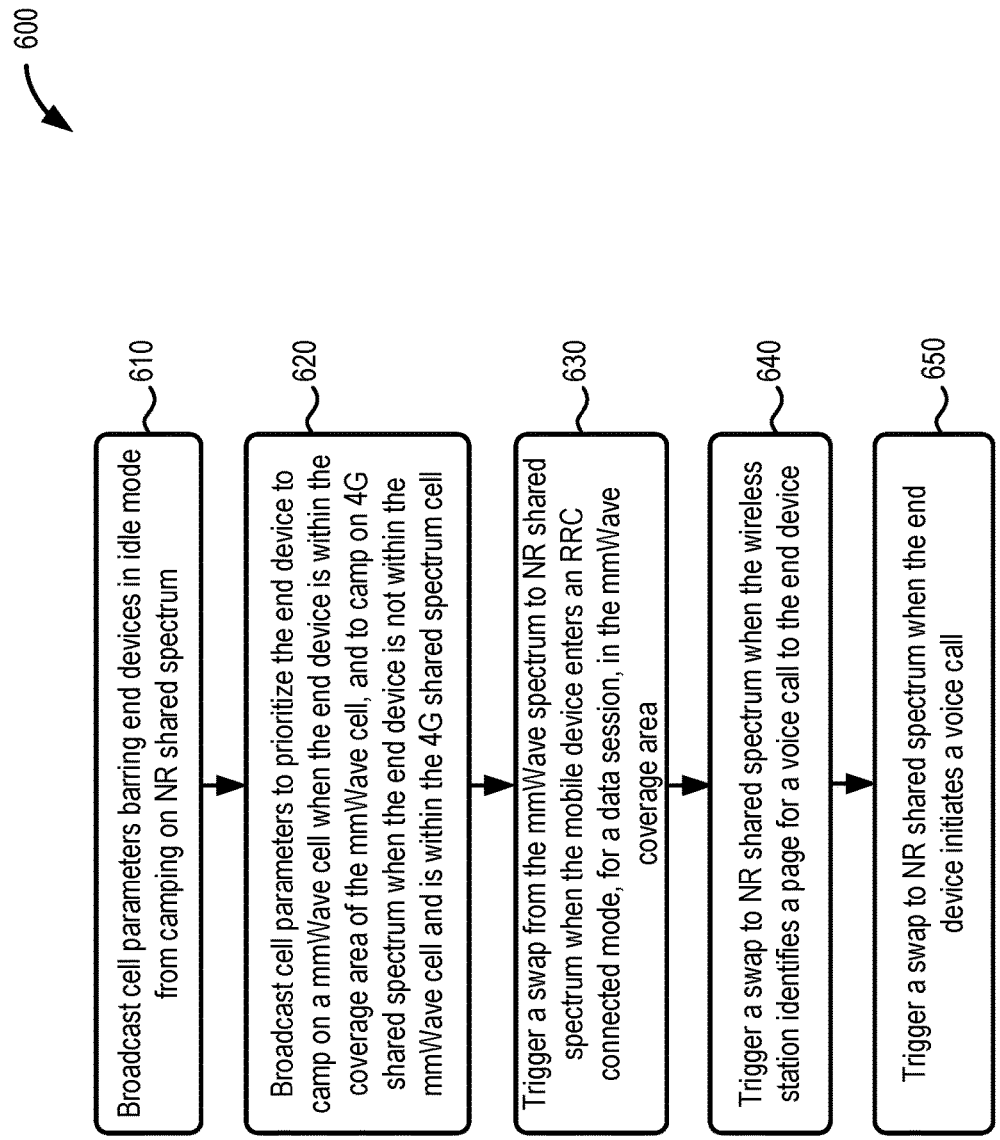

METHOD AND SYSTEM FOR SUPPORTING VOICE CALLS IN 5G NEW RADIO ENVIRONMENTS

CROSS-REFERENCE TO RELATED APPLICATION

This patent application is a continuation of U.S. patent application Ser. No. 16/862,609, entitled "Method And System for Supporting Voice Calls in 5G New Radio Environments," filed on Apr. 30, 2020; which is a continuation of U.S. patent application Ser. No. 16/031,332, filed on Jul. 10, 2018 (which issued as U.S. Pat. No. 10,681,559); which claims priority from U.S. Provisional Patent Application No. 62/691,981, filed Jun. 29, 2018, the contents of which are incorporated herein by reference in their entirety.

BACKGROUND

The development and design of future generation wireless networks (e.g., 3GPP Fifth Generation (5G) networks) is currently underway by various organizations, service providers, and so forth. 5G networks, for example, may use different frequencies, different radio access technologies, and different core network functions that can provide an improved experience over current or legacy wireless networks (e.g., 4G networks). However, the transition from such systems to 5G networks presents a challenge for network service providers, to concurrently support users of older technologies and users of the new systems within the limits of the available wireless spectrum.

BRIEF DESCRIPTION OF THE DRAWINGS

FIG. 6 is a flow diagram illustrating an exemplary process for cell selection to support voice calls in a multi-RAT dual connectivity environment.

DETAILED DESCRIPTION OF THE PREFERRED EMBODIMENTS

Figure 1A:
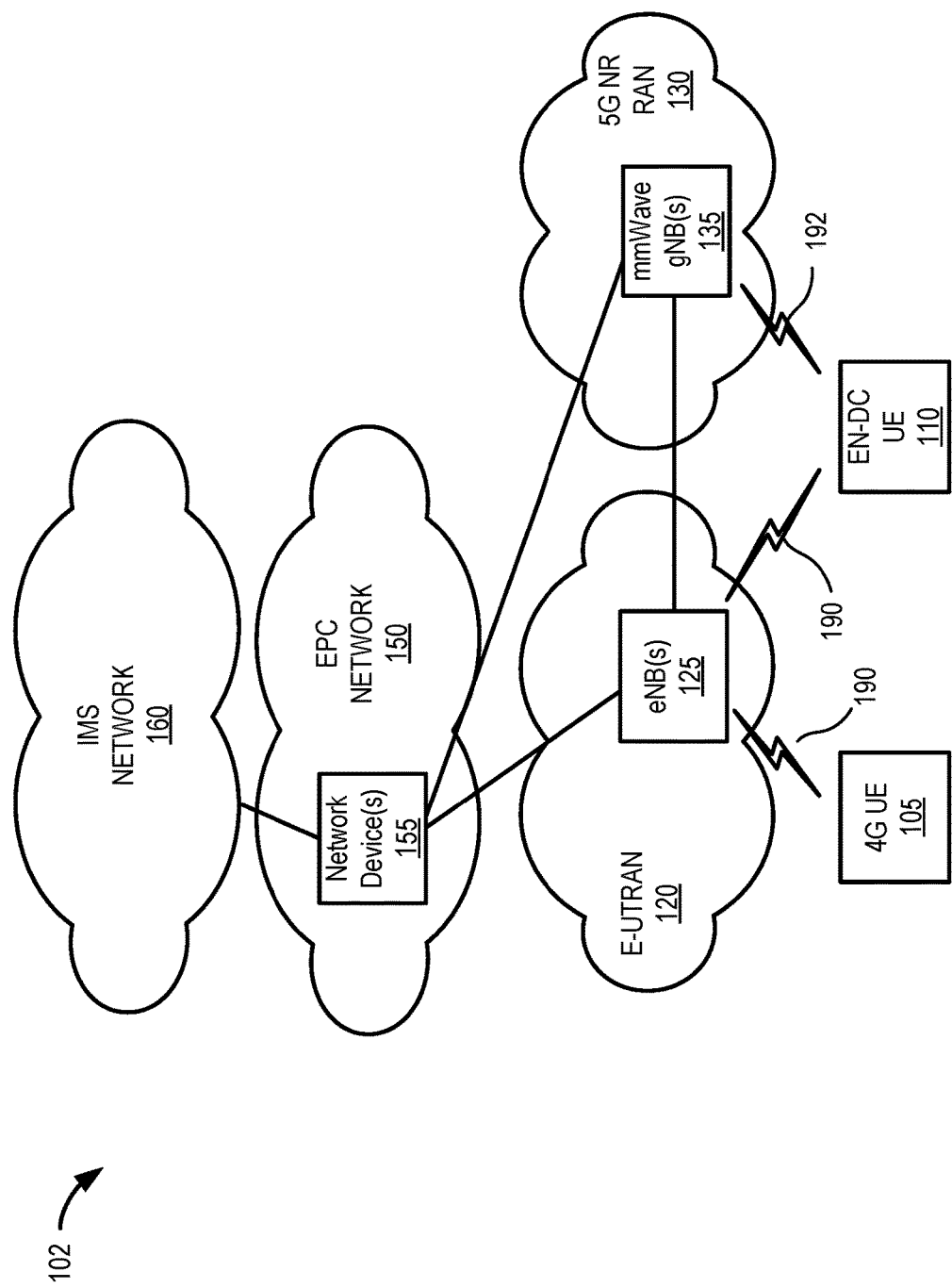
FIGS. 1A-1C are diagrams illustrating an exemplary multi-RAT dual connectivity network environments in which systems and methods described herein may be implemented.

The following detailed description refers to the accompanying drawings. The same reference numbers in different drawings may identify the same or similar elements. Also, the following detailed description does not limit the invention.

New wireless networks, such as Fifth Generation New Radio networks (5G-NR), present opportunities for greater speeds, lower latency, and more connected devices than wireless networks based on earlier standards. For example, 5G-NR networks are not directly compatible with networks based on 4G standards. 5G-NR networks require different RAN technology and different core network functions than those currently used for 4G networks. However, 5G-capable end devices will continue to rely on 4G connections due to the limited coverage areas for of 5G-NR networks, especially while service providers are continuing to build the 5G infrastructure.

Some 5G-NR coverage may rely on a spectrum currently designated for 4G connections (e.g., a shared spectrum), while other 5G-NR coverage will use a much higher frequency spectrum (e.g., Gigahertz frequencies such as centimeter wave or millimeter wave, referred to herein as mmWave NR, or simply mmWave). The shared spectrum designated for 4G may be statically or dynamically shared with 5G-NR. In contrast with cell sizes for lower frequency bands (e.g., Megahertz frequencies, which may cover several miles), cell sizes for mmWave NR may be less than a thousand foot radius. Thus, use of lower frequency bands may be needed to provide continuous 5G-NR coverage (e.g., using a combination of lower frequency band cells and mmWave cells). Limited availability of wireless spectrum precludes simply assigning a dedicated 5G spectrum to lower frequency bands. Instead, a lower frequency 5G spectrum will gradually replace the 4G spectrum over time as more 5G-capable end devices enter the marketplace.

Dual connectivity solutions are employed when end devices (e.g., user equipment (UE)) can connect to different radio access technology (RAT) types simultaneously or to different frequencies in the same RAT. For example, an end device can connect simultaneously to a 5G NR radio access network (RAN) and an Evolved Universal Mobile Telecommunications System (UMTS) Terrestrial Radio Access Network (E-UTRAN) of a Long Term Evolution (LTE) network. In such cases, downlink and uplink packets can be transmitted over one or both of the radio access technologies. Thus, end devices can connect simultaneously to 5G NR and E-UTRAN for different bearers (e.g., different logical channels with particular end-to-end quality of service (QoS) requirements) or even split bearers.

During the transition from 4G networks to 5G, end devices may switch between different frequency bands, core networks, and RANs that support either 4G or 5G standards. In a mobility context, cellular service providers need to support continuity of voice and data connections, to provide a good user experience for customers while maximizing the benefits of 5G connections. However, switching between the different frequency bands, core networks, and/or RANs can cause service interruptions when an end device changes network connections mid-session. In some use cases, these service interruptions may not affect the user experience. However, continuity of voice calls presents a particular challenge in a 4G/5G mobility context, since voice services typically have the most stringent requirements in terms of latency and user experience.

Systems and methods provided herein ensure reliable voice connections and the highest possible data rates in 5G NR dual-connectivity environments, given the limitations of available 4G and 5G spectrum. A system may include a first wireless station (e.g. an eNB/gNB) and a second wireless station (e.g., a mmWave gNB). The first wireless station provides for a shared spectrum of a first frequency band (e.g., a low or medium frequency band assigned to a cellular service provider). The shared spectrum may include a first spectrum for a first cellular wireless standard (e.g., 4G/LTE) and a second spectrum for a second cellular wireless standard (e.g., 5G NR). The second wireless station is at least partially within a coverage area of the first wireless station and provides a third spectrum for the second cellular wireless standard. The third spectrum is a mmWave spectrum. The first wireless station broadcasts cell parameters barring an end device in the idle mode from camping on the second spectrum. The first wireless station or the second wireless station triggers the end device to swap (or redirect) to the second spectrum when a paging request for a voice call is received. The system and methods maximize the network capacity by encouraging use of the 5G standalone architecture, while minimizing the frequency of core/RAT changes, particularly for voice calls.

Figure 1B:
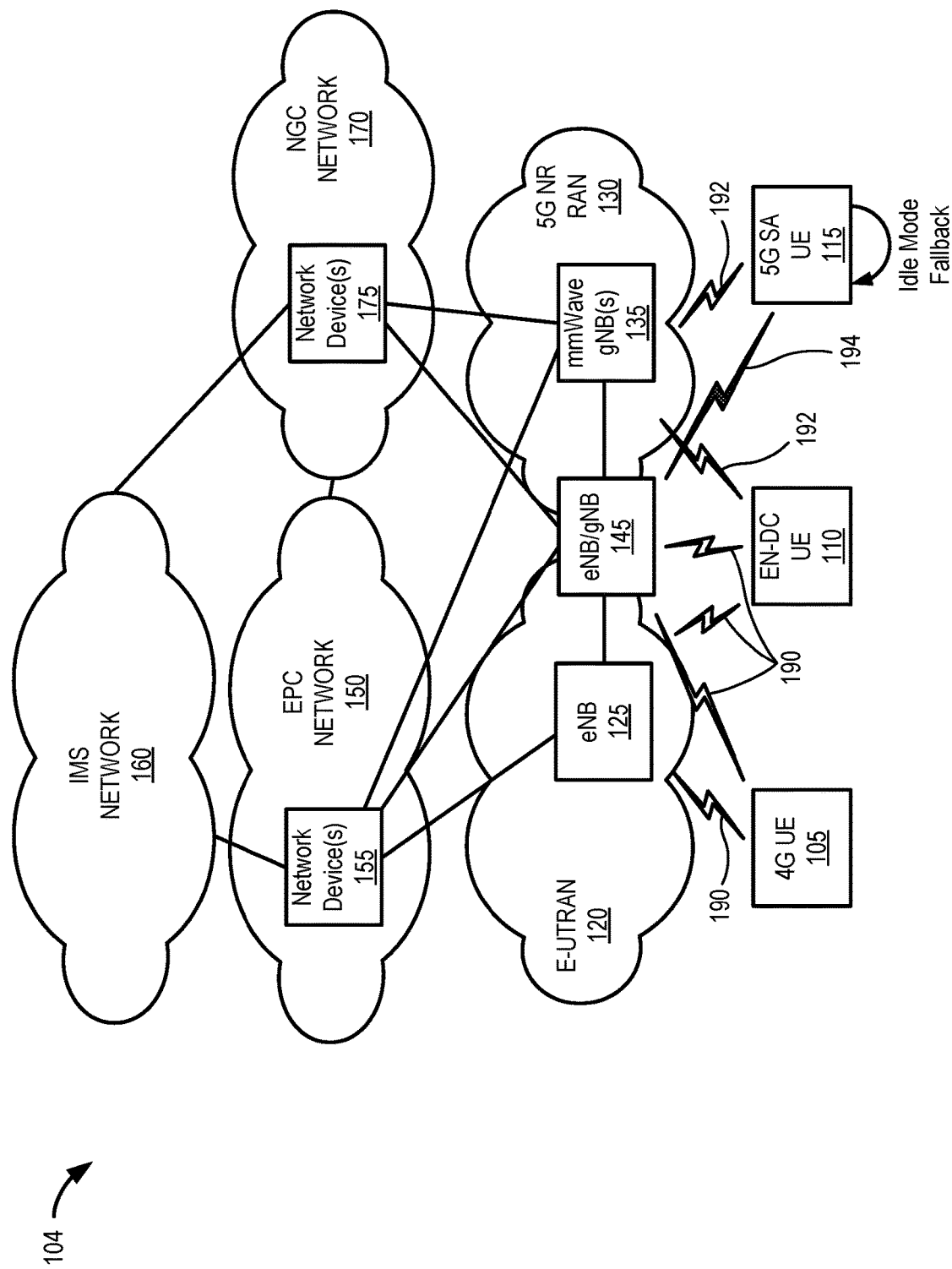
Figure 1C:
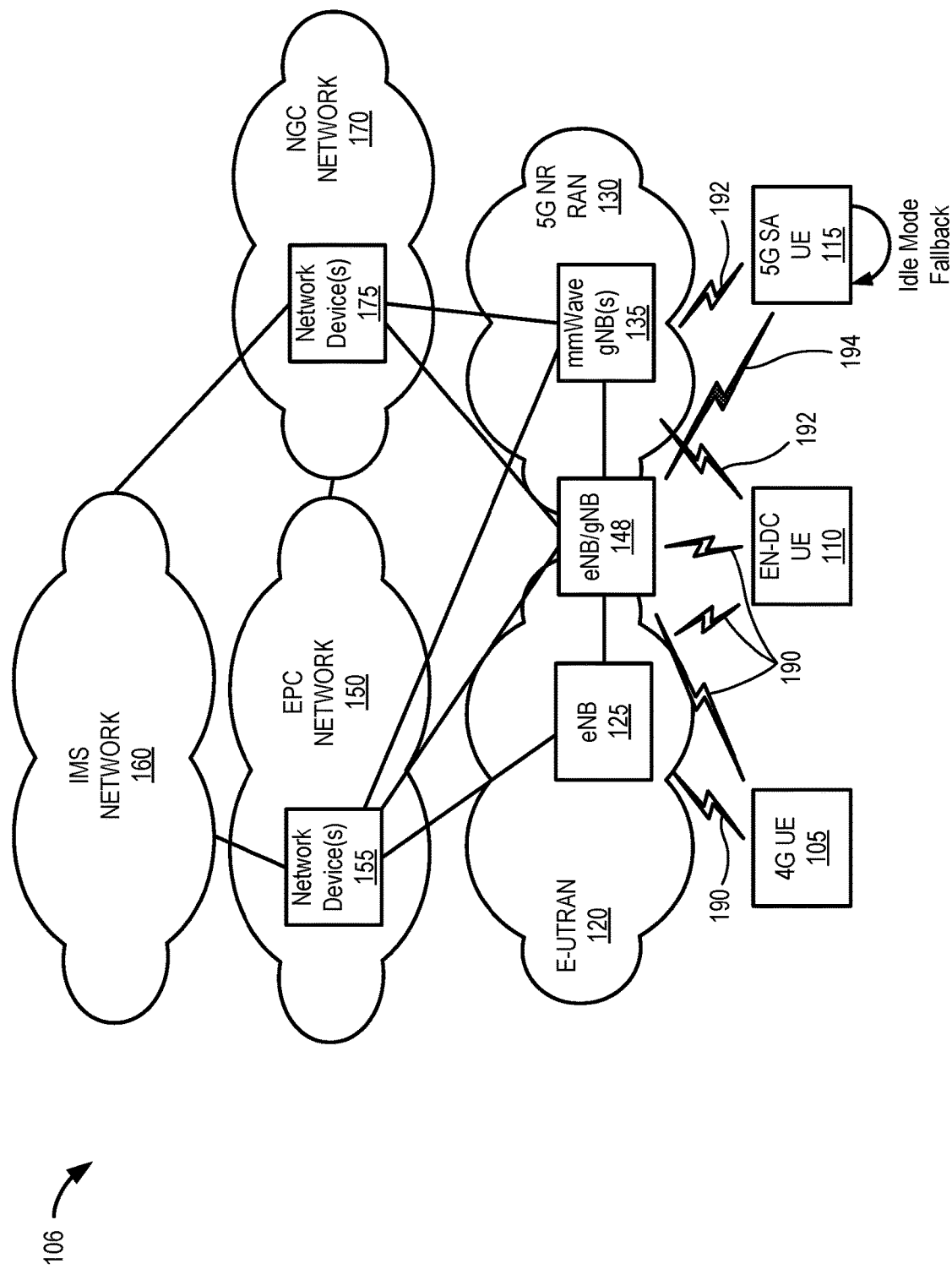

FIGS. 1A-1C are diagrams illustrating an exemplary multi-RAT dual connectivity network environments in which systems and methods described herein may be implemented. In particular, FIG. 1A is a diagram of an exemplary network environment 102 for introducing a 5G network/devices. As shown in FIG. 1A, environment 102 may include 4G-capable user equipment (UE) 105, Evolved Universal Mobile Telecommunications System (UMTS) Terrestrial Radio Access (E-UTRA)—5G New Radio (NR) Dual Connectivity (EN-DC)-capable UE 110, an E-UTRA network including one or more eNodeBs (eNB) 125, a 5G NR RAN 130 including one or more mmWave gNBs 135, an evolved packet core (EPC) network 150 with network devices 155, and an Internet Protocol (IP) multimedia subsystem (IMS) network 160. 4G UE 105 and EN-DC UE 110 may be collectively referred to herein as "end devices" or generically as "end device." Similarly, eNB 125 and mmWave gNB 135 may be collectively referred to herein as "wireless stations 125/135" or generically as "wireless station 125/135." According to other embodiments, environment 102 may include additional networks, fewer networks, and/or different types of networks than those illustrated and described herein.

Environment 102 includes links between the networks and between the devices. Environment 102 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1A. Additionally, the number and the arrangement of links illustrated in environment 102 are exemplary.

In the configuration of FIG. 1A, 4G UE 105 may use a wireless channel 190 to access E-UTRAN 120. Wireless channel 190 may correspond, for example, to physical layer protocols in accordance with 4G radio access technology. More particularly, for example, a wireless channel 190 may correspond to physical layer protocols for 4G RAN standards (e.g., 3GPP standards for 4G air interfaces, etc.). EN-DC UE 110 may use wireless channels 190 and 192 to access E-UTRAN 120 and 5G NR RAN 130, respectively. According to implementations described herein, 4G UE 105 and/or EN-DC UE 110 may support carrier aggregation of more than one carrier frequency band for uplink and/or downlink transmissions.

Wireless channels 192 may correspond, for example, to physical layer protocols in accordance with 5G radio access technology. More particularly, for example, wireless channel 192 may correspond to physical layer protocols for 5G NR standards (e.g., 3GPP standards for 5G air interfaces, etc.). Wireless channels 190/192 may be used to provide communications to/from EN-DC UE 110 using dual-connectivity with different bearers and/or split bearers.

4G UE 105 may include a computational device that is capable of communicating with E-UTRAN 120. 4G UE 105 may enable a user to access EPC network 150 and/or interact with devices in IMS network 160. 4G UE 105 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices.

EN-DC UE 110 may include a computational device having multiple coverage mode capabilities, and thus the capability to communicate simultaneously with different wireless stations (e.g., eNB 125, gNB 135, etc.) using different wireless channels (e.g., channels 190/192) corresponding to the different RANs (e.g., E-UTRAN 120 and 5G NR RAN 130). Thus, EN-DC UE 110 may be referred to herein as an EN-DC-capable end device when distinguishing from an end device that is not EN-DC-capable, such as 4G UE 105. EN-DC UE 110 may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or a digital camera that includes communication capabilities (e.g., wireless communication mechanisms such as Wi-Fi). In other implementation, EN-DC UE 110 may be implemented as a machine-type communications (MTC) device, an Internet of Things (IoT) device, a machine-to-machine (M2M) device, etc.

eNB 125 may include a network device that has computational and wireless communication capabilities. In some instances, eNB 125 may be referred to as a "wireless station." eNB 125 may include a transceiver system and other components that allow 4G UE 105 to wirelessly connect to E-UTRAN 120 and core network 140. eNB 125 may interface with EPC network 150 via a Diameter S1 interface, for example.

Millimeter wave gNB 135 may include a network device and other components that allow EN-DC UE 110 to wirelessly connect to 5G NR RAN 130 and EPC network 150. According to the implementation of FIG. 1A, mmWave gNB 135 may use dedicated mmWave frequencies (e.g., wireless channels 192) that are distinct from lower frequency bands used for 4G (e.g., wireless channels 190). In one implementation, gNB 135 may interface with EPC network 150 via a Diameter S1 interface.

EPC network 150 may include one or multiple networks of one or multiple types. According to an exemplary implementation, EPC network 150 includes a complementary network pertaining to multiple RANs. For example, EPC network 150 may include the core part of an LTE network, an LTE-A network, a legacy network, and so forth. Depending on the implementation, EPC network 140 may include various network elements that may be implemented in network devices 155. Such network elements may include a mobility management entity (MME), a packet data network gateway (PGW), a serving gateway (SGW), a policy charging rules function (PCRF), a home subscriber server (HSS), as well other network elements pertaining to various network-related functions, such as billing, security, authentication and authorization, network polices, subscriber profiles, and/or other network elements that facilitate the operation of EPC network 150.

IMS network 160 may include a network for delivering IP multimedia services as specified by 3GPP and may provide media flows between end devices 105/110/115 and external IP networks or other networks (not shown in FIG. 1). IMS network 160 may include devices and/or functions to support voice calls, data calls, and other applications for end devices.

FIG. 1B is a diagram of an exemplary network environment 104 for introducing standalone (SA) core architecture for 5G networks. More particularly, network environment 104 may be used to introduce static spectrum sharing for 4G and 5G RAN connections. Network environment 104 may include, in addition to the network elements of network environment 102, a 5G SA UE 115, one or more combined eNB/gNBs 145 and a next generation core (NGC) network 170 with network devices 175. 4G UE 105, EN-DC UE 110 and 5G SA UE 115 may be collectively referred to herein as "end devices" or generically as an "end device." Similarly, eNB 125, mmWave gNB 135, and combined eNB/gNB 145 may be collectively referred to herein as "wireless stations" or generically as a "wireless station." According to other embodiments, environment 104 may include additional networks, fewer networks, and/or different types of networks than those illustrated and described herein.

Environment 104 includes links between the networks and between the devices. Environment 104 may be implemented to include wired, optical, and/or wireless links among the devices and the networks illustrated. Additionally, the number and the arrangement of links illustrated in environment 104 are exemplary.

In the configuration of FIG. 1B, 5G SA UE 115 may use wireless channels 192 and 194 to access 5G NR RAN 130. Similar to wireless channels 192, wireless channels 194 may correspond to physical layer protocols in accordance with 5G radio access technology. However, in contrast with the mmWave frequencies of wireless channels 192, wireless channel 194 may use lower frequency bands (e.g., shared with 4G). Wireless channels 192/194 may be used to provide communications to/from 5G SA UE 115 using dual-connectivity with different bearers and/or split bearers.

Similar to EN-DC UE 110, 5G SA UE 115 may include a computational or communication device having multiple coverage mode capabilities, and thus the capability to communicate simultaneously with different wireless stations (e.g., gNB 135, eNB/gNBs 145, etc.) using different wireless channels (e.g., channels 192/194) corresponding to 5G NR RAN. In contrast with EN-DC UE 110, 5G SA UE 115 may be configured to use, among other channels, wireless channel 194 with lower frequency bands for 5G. 5G SA UE 115 may also be equipped to fall back from a 5G RAN connection to an E-UTRAN connection (not shown) when in idle mode.

mmWave gNB 135 may include a network device and other components that allow 5G SA UE 115 to connect to 5G NR RAN 130, using 5G frequency bands. Combined eNB/gNB 145 may include a network device and other components that allow 5G SA UE 115 to wirelessly connect to 5G NR RAN 130 and NGC network 170. According to the implementation of FIG. 1B, eNB/gNBs 145 may use portions of the lower frequency bands (e.g., wireless channels 194 for 5G communications) that are part of (but distinct from) the lower frequency bands allocated for 4G communications (e.g., wireless channels 190). For example, in one implementation, eNB/gNBs 145 may be configured to statically allocate portions of allocated spectrum (e.g., Band 2, 1900 PCS) for 4G and 5G connections. As used herein, "NR shared spectrum" may refer to lower frequency bands (in comparison to mmWave frequencies) allocated for 5G, and "4G shared spectrum" may refer to lower frequency bands allocated for 4G. In one implementation, eNB/gNBs 145 may interface with EPC network 150 via a Diameter S1 interface and interface with 5G NR RAN 130 via an NG3 interface.

NGC network 170 includes a core network to support standalone 5G standards. For example, NGC network 170 may include various network devices 175 that support the core part of a next generation network. By way of further example, NGC network 170 may include a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and a charging system (CS). According to other exemplary embodiments, the next generation core network may include additional, different, and/or fewer network devices than those described.

FIG. 1C is a diagram of an exemplary network environment 106 for using (SA) core architecture for 5G networks. More particularly, network environment 106 may be used to introduce dynamic spectrum sharing for 4G and 5G RAN connections. Network environment 106 may include the network elements of network environment 104, with the exception that combined eNB/gNBs 145 may be replaced by a combined eNB/gNBs 148, which are configured to provide dynamic spectrum sharing, as described further herein. According to other embodiments, environment 104 may include additional networks, fewer networks, and/or different types of networks than those illustrated and described herein.

Similar to eNB/gNB 145, combined eNB/gNB 148 may include a network device and other components that allow 5G SA UE 115 to wirelessly connect to 5G NR RAN 130 and NGC network 170. According to the implementation of FIG. 1C, eNB/gNBs 148 may use static portions of some lower frequency bands that are part of (but distinct from) the lower frequency bands allocated for 4G communications (e.g., wireless channels 190). Additionally, in contrast with eNB/gNB 145, eNB/gNB 148 may be configured to dynamically allocate shared spectrum between 4G and 5G channels for other frequency bands. For example, in one implementation, eNB/gNBs 148 may be configured to statically allocate Band 5 frequencies and dynamically allocate Bands 2 and 66 for different 4G and 5G connections. Similar to eNB/gNB 145, eNB/gNBs 148 may interface with EPC network 150 via a Diameter S1 interface and interface with 5G NR RAN 130 via an NG3 interface.

Together, FIGS. 1A-1C provide a simplified overview of network arrangements to gradually implement 5G networks. Referring collectively to FIGS. 1A-1C, radio resource control (RRC) may be considered a protocol for handling signaling between an end device 105/110/115 and a radio access network (e.g., E-UTRAN 120 and/or 5G NR RAN 130). RRC states (e.g., "idle mode," "connected mode") may be handled, for example, at a control plane which includes an RRC layer. During the RRC idle mode, an end device 105/110/115 may camp on a cell after cell selection or reselection takes place, where factors such as, for example, radio link quality, cell status, and radio access technology may be considered. As used herein "camping" on a selected cell refers to end device 105/110/115 maintaining data exchanges with a core network within the confines of a selected cell. A "cell" may include a coverage area served by a wireless station (e.g., one of eNBs 125, gNB 135, or eNB/gNB 145) using a particular frequency band. Thus, in some cases, a cell and the wireless station servicing the cell may be referred to interchangeably.

End devices 105/110/115 may also monitor a paging channel to detect incoming calls and acquire system information. In the idle mode, the control plane protocols include cell selection and reselection procedures. During the RRC connected mode, end device 105/110/115 may provide a wireless station 125/135/145 with downlink channel quality and neighbor cell information, so that E-UTRAN 120 and/or 5G NR RAN 130 may assist end device 105/110/115 to select the most suitable cell. Particularly, end device 105/110/115 may measure parameters associated with a current cell to which end device 105/110/115 is attached, as well as the neighboring cells, to make a decision to camp on the cell providing the strongest signal. The key parameters of the cell, (e.g., found in the master information block (MIB) and the system information blocks (SIBs) broadcast by wireless stations 125/135/145), may be scanned for the intra-frequency and inter-frequency neighboring cells. The measurements may be tracked and uploaded to the RRC layer, which makes control decisions on which cell end device 105/110/115 is to camp. Accordingly, cell selection/reselection may be based on a number of levels of criteria, which may include absolute priority, radio link quality, and/or cell accessibility.

With the introduction of the 5G SA architecture (e.g., FIGS. 1B and 1C), end devices 110/115 may select between multiple RAT-types (e.g., using eNB 125, mmWave gNB 135, and eNB/gNB 145 or eNB/gNB 148). A selection may be network driven or UE/application driven. While 5G mmWave connections can offer users the highest speeds, in a mobility context the limited cell size (or coverage area) of a mmWave cell can require frequent core network changes (e.g., between EPC network 150 and NGC network 170) and RAT changes (e.g., between eNB 125, mmWave gNB 135, and eNB/gNB 145 or eNB/gNB 148). Since core network changes and RAT changes can interrupt a service when an end device 110/115 is in RRC connected mode, it is desirable to reduce the frequency of core network changes and RAT changes as much as possible, and particularly so when an end device 110/115 is the in RRC connected mode, with a voice connection.

Figure 2A:
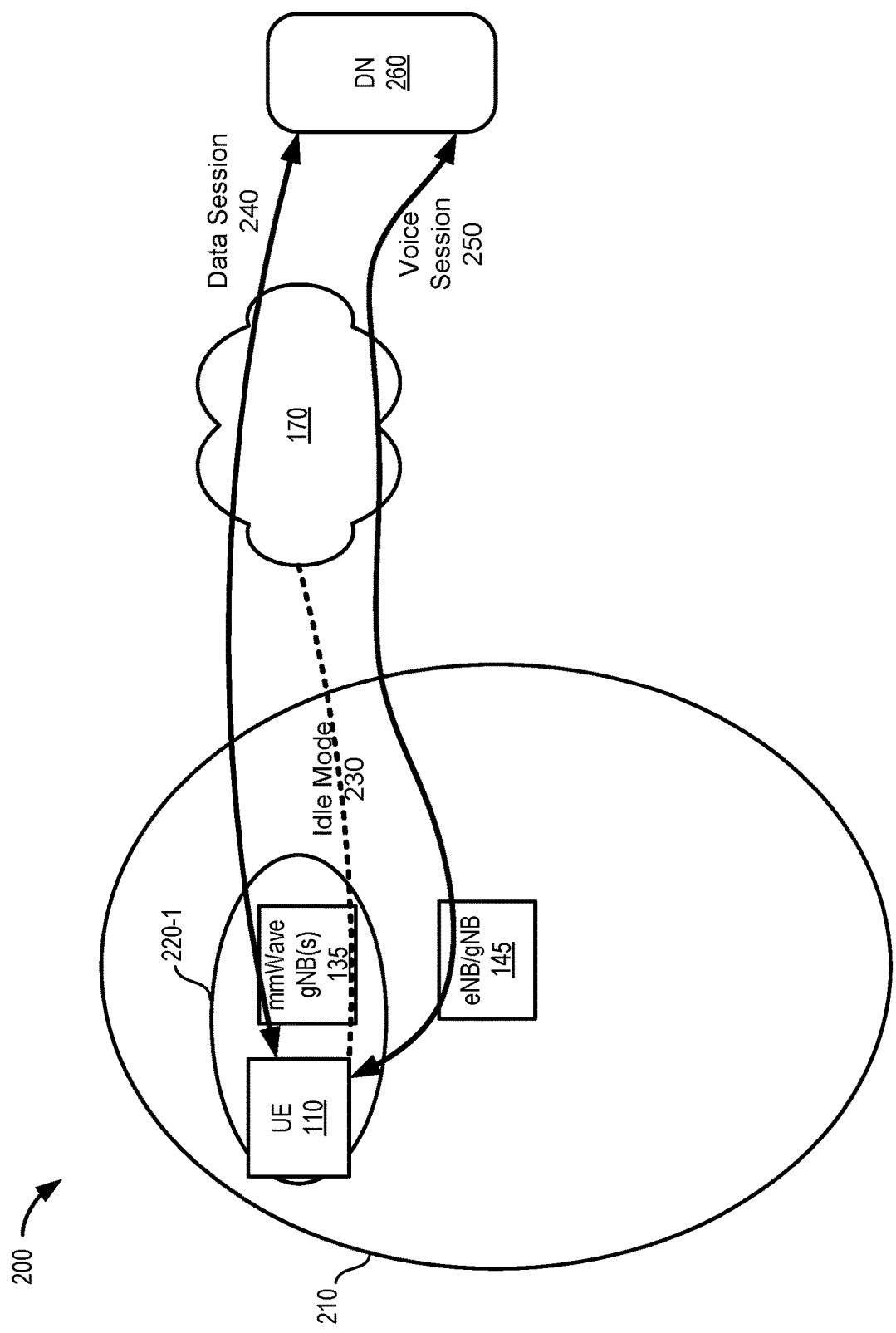
FIG. 2A is a diagram illustrating exemplary communications for an end device within a millimeter wave (mmWave) coverage area in a portion of the network environment of FIG. 1B.
Figure 2B:
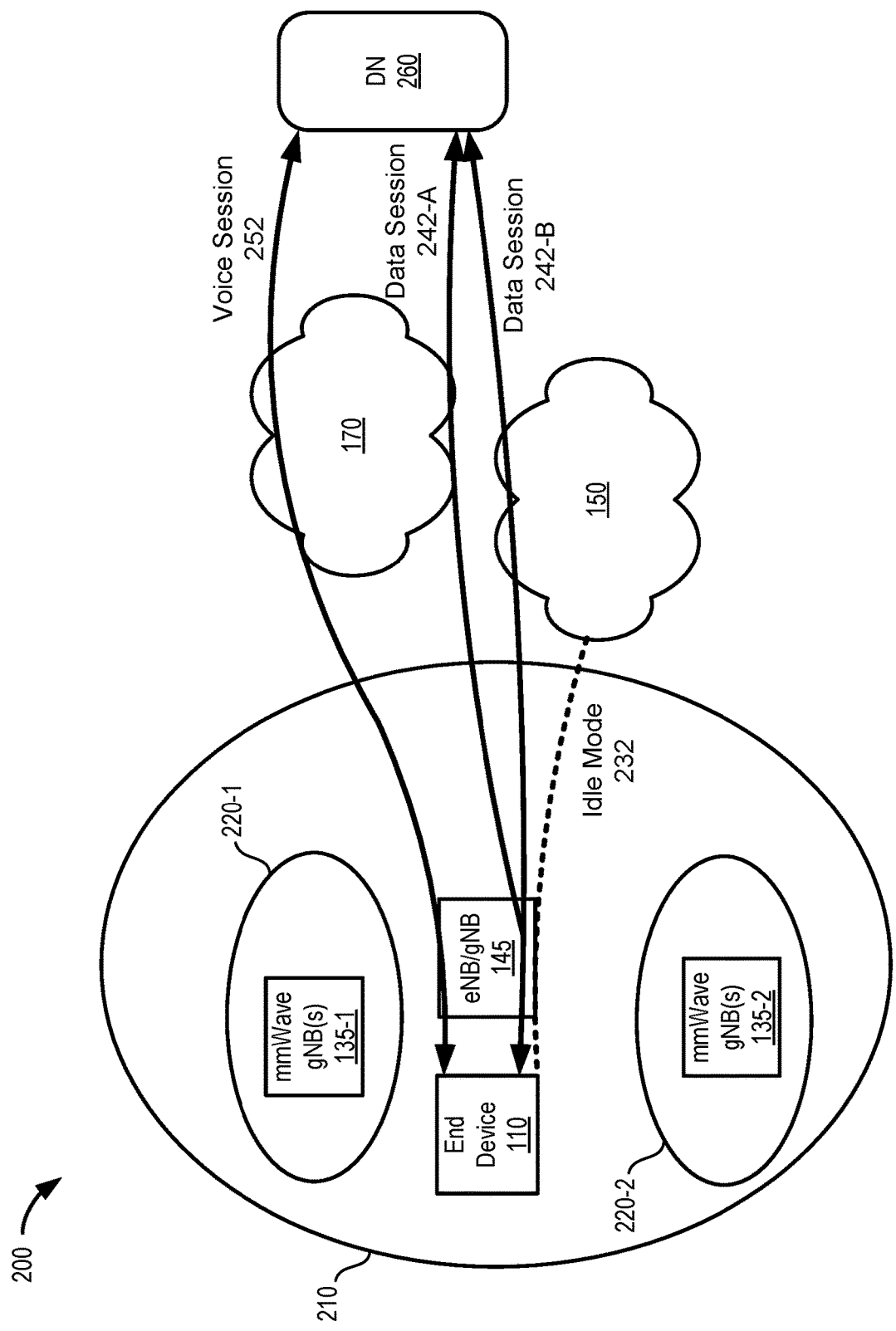
FIG. 2B is a diagram illustrating exemplary communications for an end device outside a mmWave coverage area in a portion of the network environment of FIG. 1B.
Figure 2C:
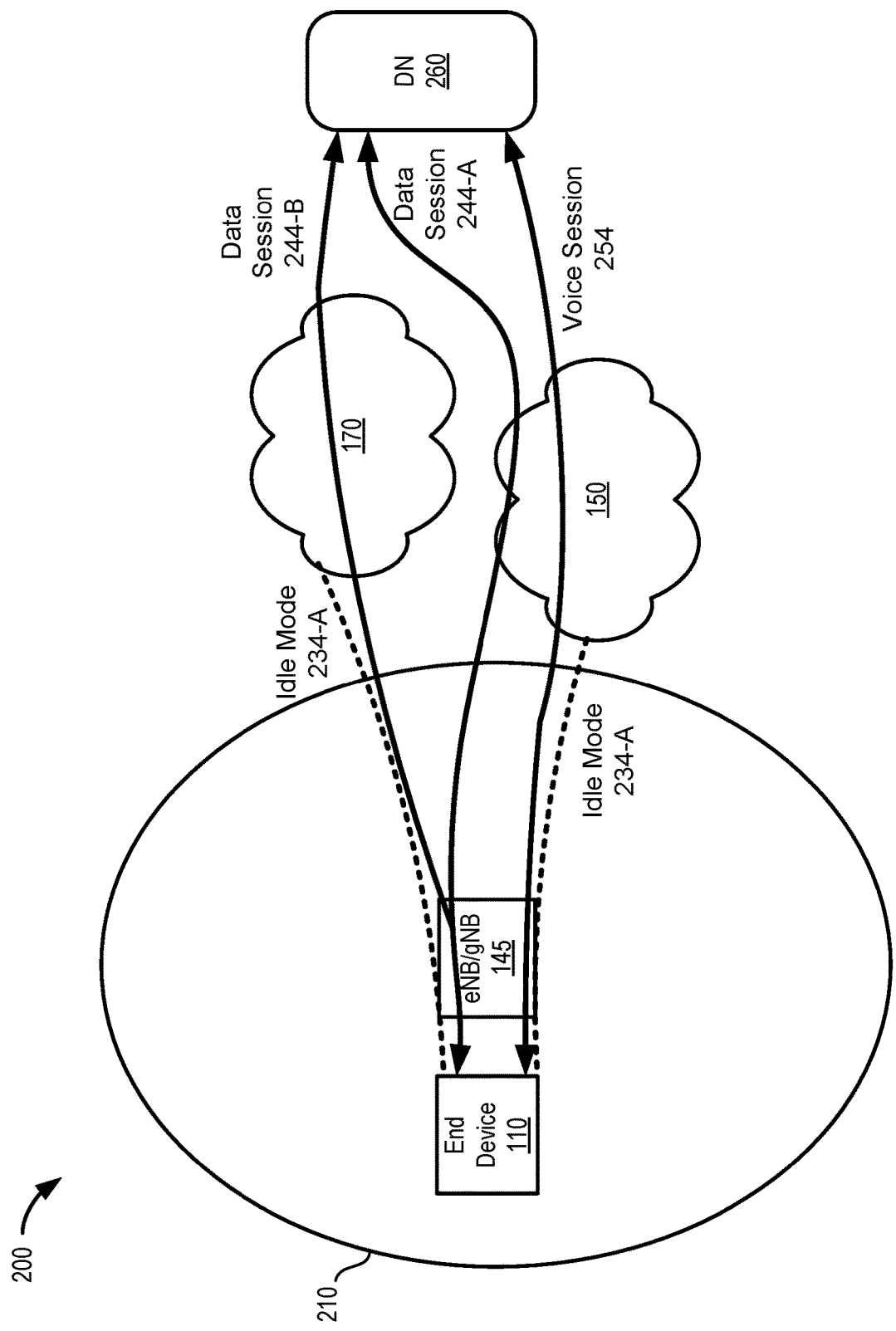
FIG. 2C is a diagram illustrating exemplary communications for an end device in a coverage area that does not include mmWave support in a portion of the network environment of FIG. 1B.

FIG. 2A-2C are diagrams illustrating exemplary connections for UE 110 in a portion 200 of network environment 104. FIG. 2A-2C generally show connections between UE 110 and a data network (DN) 260 that may be an intermediate point or endpoint for a voice/data session with UE 110. Particularly, FIG. 2A is a diagram illustrating exemplary connections when UE 110 is within a mmWave coverage area 220-1 (e.g., serviced by gNB 135) that is also within a coverage area 210 (e.g., services by eNB/gNB 145) with the shared spectrum for 5G. According to implementations described herein, when UE 110 is in the RRC idle mode and located within the coverage area of a mmWave cell, UE 110 may camp on the mmWave cell (e.g., mmWave cell 220-1), as indicated by reference 230. When UE 110 changes to the RRC connected mode, UE 110 may swap to use eNB/gNB 145 as a primary node for dual connectivity, with gNB 135 as a secondary cell. For voice sessions (e.g., voice session 250), shared 5G spectrum may be used over the primary cell (e.g., eNB/gNB 145) to ensure uninterrupted mobility. For data sessions (e.g., data session 240), mmWave spectrum may be used over the secondary cell (e.g., gNB 135) to provide the highest connection speeds.

Referring to FIG. 2B, exemplary connections are shown when UE 110 is outside a mmWave coverage areas 220 but within coverage area 210 (e.g., serviced by eNB/gNB 145) with shared spectrum for 5G. According to implementations described herein, when UE 110 is in the RRC idle mode and located within the coverage area of a combined eNB/gNB 145, UE 110 may camp on a 4G frequency band of eNB/gNB 145, as indicated by reference 232. When UE 110 changes to the RRC connected mode for a data session, UE 110 may swap to initially use eNB/gNB 145 for the shared spectrum for 5G (as shown by data session 242-A), and switch to a non-standalone spectrum for EPC network 150 (as shown by data session 242-B) to provide more available spectrum. For voice sessions (e.g., voice session 252), shared 5G spectrum may be used over eNB/gNB 145 to ensure uninterrupted mobility. For data sessions that are concurrent with voice session 252, only the shared 5G spectrum (e.g., data session 240-A) may be used until the voice call ends to avoid a RAT change or core network change during the voice call.

Referring to FIG. 2C, exemplary connections are shown when UE 110 is in a coverage area 210 (e.g., serviced by eNB/gNB 145) with NR shared spectrum for 5G and without any mmWave coverage available. According to implementations described herein, when UE 110 is in the RRC idle mode and located within the coverage area of a combined eNB/gNB 145, UE 110 may camp on either a 4G frequency band or a 5G frequency band of eNB/gNB 145, as indicated by reference 234-A and 234-B, respectively. When UE 110 changes to the RRC connected mode for a data session, UE 110 may use dual connectivity (as shown by data session 244-A and data session 244-B) to provide a desired bandwidth. For voice sessions (e.g., voice session 254), a 4G spectrum (e.g., voice-over-LTE) may be used over eNB/gNB 145 with a master cell group (MCG) to ensure uninterrupted mobility. For data sessions that are concurrent with voice session 254, the MCG and a secondary control group (SCG) may be used to provide data (e.g., data session 244-A and data session 244-B) during the voice call.

Although FIGS. 2A-2C illustrate an exemplary connections for anchor cell selection in a multi-RAT dual connectivity environment, according to other exemplary embodiments, additional, different, and/or fewer connections may be used.

Figure 3:
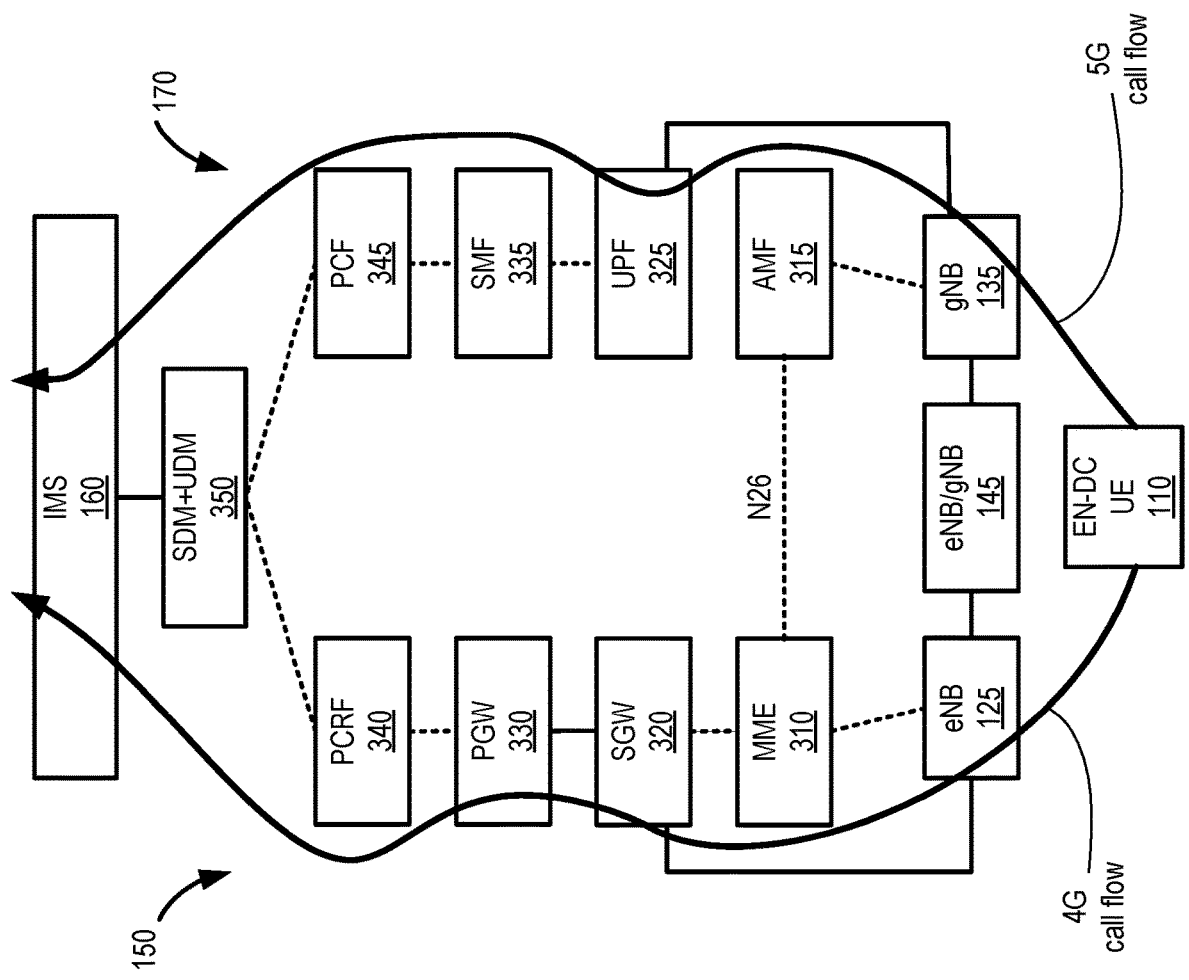
FIG. 3 is a diagram illustrating exemplary network elements for voice support in Evolved Packet Core (EPC) and New Radio (NR) core networks.

FIG. 3 is a diagram illustrating exemplary network elements for voice support in network environment 104. EPC network 150 may provide core network services for 4G/LTE standards. EPC network 150 may also provide core network service for 5G NR standards over mmWave (e.g., gNB 135) in a non-standalone 5G configuration (e.g., such as shown in FIG. 1A). NGC network 170 may provide core network service for 5G NR standards over mmWave (e.g., gNB 135) and NR shared spectrum (e.g., eNB/gNB 145)

EPC network 120 may include MME 310, SGW 320, PGW 330, and PCRF 340. Each of MME 310, SGW 320, PGW 330, and PCRF 340 may be implemented as network devices or virtual functions executed on network devices.

MME 310 may implement control plane processing for EPC network 120. For example, MME 310 may implement tracking and paging procedures for UE 110, may activate and deactivate bearers for UE 110, may authenticate a user of UE 110, and may interface to non-LTE radio access networks (such as mmWave gNB 135). MME 310 may communicate with AMF 315 via an N26 interface (e.g., via HTTPS) to provide context transfer in support of inter-RAT handovers.

SGW 320 may provide an access point to and from UE 110, may handle forwarding of data packets for UE 110, and may act as a local anchor point during handover procedures between eNBs 125, gNBs 135, and/or eNB/gNB 145.

PGW 330 may function as a gateway to IMS network 160. A particular UE 110, while connected to a single SGW 320, may be connected to multiple PGWs 330—one for each packet network with which UE 110 communicates. PGW 330 may enforce policies from PCRF 340, such as uplink and downlink data speeds, for individual sessions by UE 110.

PCRF 340 provides policy control decision and flow-based charging control functionalities. PCRF 340 may provide network control regarding service data flow detection, gating, quality of service (QoS) and flow-based charging, etc. PCRF 340 may determine how a certain service data flow shall be treated, and may ensure that traffic mapping and treatment is in accordance with a user's subscription profile.

Referring to NGC network 170, NGC network 170 may include AMF 315, UPF 325, SMF 335, and PCF 345. Each of AMF 315, UPF 325, SMF 335, and PCF 345 may be implemented as network devices or virtual functions executed on network devices.

AMF 315 may generally correspond to some functions of MME 310 described above. AMF 315 may support termination of control plane signaling, registration management, connection management, mobility management, access authentication and authorization, and security context management.

UPF 325 may generally correspond to some functions of SGW 320 and PGW 330 described above. UPF 325 supports packet routing and forwarding, packet inspection, QoS handling, acts as a gateway to IMS networks, and is an anchor point for intra- and inter-RAT mobility.

SMF 335 may generally correspond to some functions of MME 310 and PGW 330 described above. SMF may support session management, UE IP address allocation and management, control plane signaling related to session management, downlink data notification, and traffic steering.

PCF 345 may generally correspond to some functionality of PCRF 340 described above. PCF 345 supports a unified policy framework, provides policy rules to control plane functions, and accesses subscription information for policy decisions in UDR.

Subscriber data manager (SDM) and Unified Data Management (UDM) function 350 may generate of Authentication and Key Agreement (AKA) credentials and may support user identification handling, access authorization, and subscription management.

As shown in FIG. 3, the 5G call flow may use mmWave spectrum to access eNB/gNB 145. If a mmWave coverage is deemed unreliable for mobility (e.g., due to the relatively small coverage areas of gNBs 135), lower frequency bands supported by eNB 125 and eNB/gNB 145 may be preferred for voice calls. Similarly, if there is insufficient NR shared spectrum to reliably support voice traffic through eNB/gNB 145, the 4G shared spectrum may be preferred for voice calls. Generally, in the environment of FIG. 3, fallback from a 5G call flow to the 4G call flow requires an idle mode mobility event (e.g., an active voice call would be disconnected). Thus, systems and methods described herein control cell selections to minimize the need for non-idle-mode fallback events during voice calls.

Figure 4:
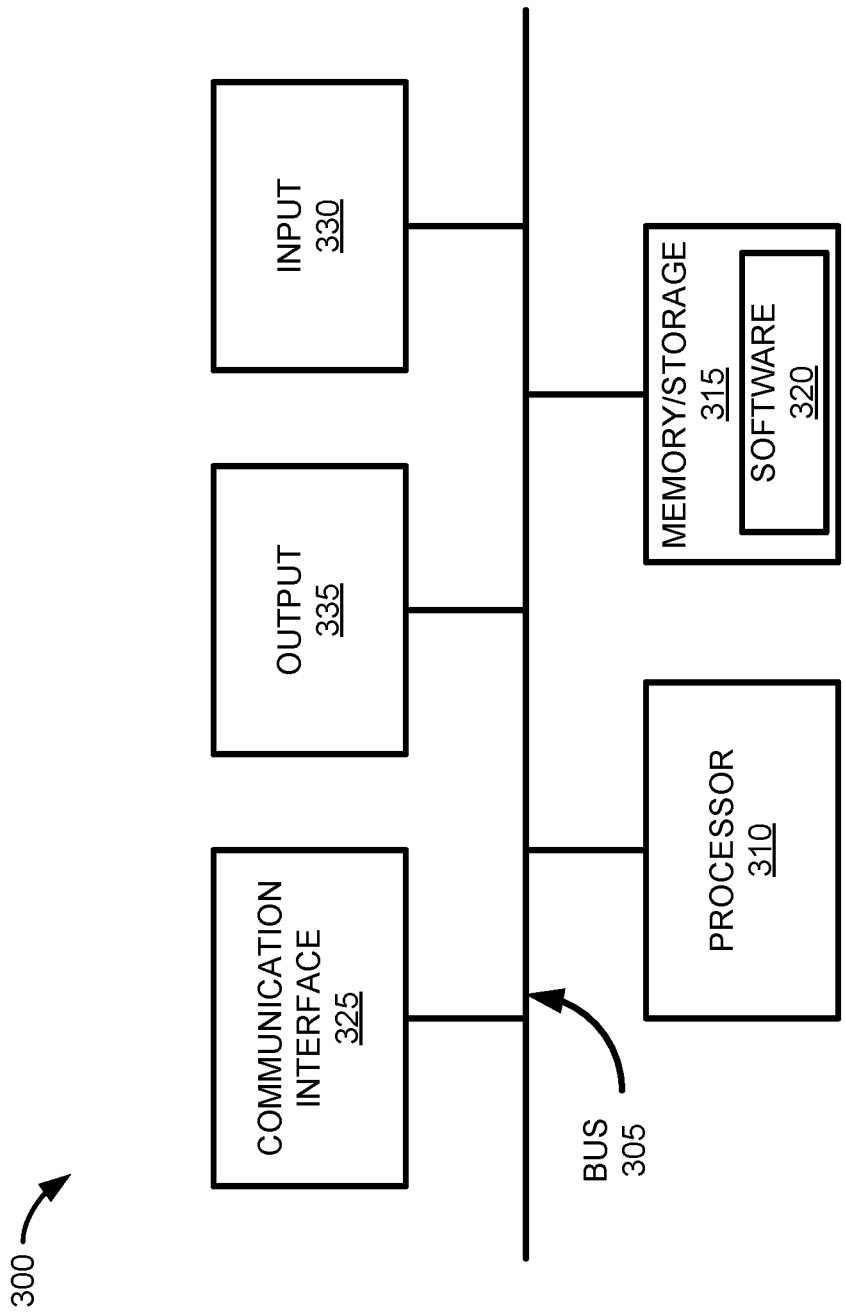
FIG. 4 is a diagram illustrating exemplary components of a device that may correspond to one or more of the devices illustrated and described herein.

FIG. 4 is a diagram illustrating exemplary components of a device 400 that may correspond to one or more of the devices described herein. For example, device 400 may correspond to components included in end device 105/110/115, wireless stations 125/135/145/148, network devices 155, or network devices 175. As illustrated in FIG. 4, according to an exemplary embodiment, device 400 includes a bus 405, a processor 410, a memory/storage 415 that stores software 420, a communication interface 425, an input 430, and an output 435. According to other embodiments, device 400 may include fewer components, additional components, different components, and/or a different arrangement of components than those illustrated in FIG. 4 and described herein.

Bus 405 includes a path that permits communication among the components of device 400. For example, bus 405 may include a system bus, an address bus, a data bus, and/or a control bus. Bus 405 may also include bus drivers, bus arbiters, bus interfaces, and/or clocks.

Processor 410 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 410 may be implemented as hardware (e.g., a microprocessor, etc.), a combination of hardware and software (e.g., a SoC, an ASIC, etc.), may include one or multiple memories (e.g., cache, etc.), etc. Processor 410 may be a dedicated component or a non-dedicated component (e.g., a shared resource).

Processor 410 may control the overall operation or a portion of operation(s) performed by device 400. Processor 410 may perform one or multiple operations based on an operating system and/or various applications or computer programs (e.g., software 420). Processor 410 may access instructions from memory/storage 415, from other components of device 400, and/or from a source external to device 400 (e.g., a network, another device, etc.). Processor 410 may perform an operation and/or a process based on various techniques including, for example, multithreading, parallel processing, pipelining, interleaving, etc.

Memory/storage 415 includes one or multiple memories and/or one or multiple other types of storage mediums. For example, memory/storage 415 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 415 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 415 may include a drive for reading from and writing to the storage medium.

Memory/storage 415 may be external to and/or removable from device 400, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 415 may store data, software, and/or instructions related to the operation of device 400.

Software 420 includes an application or a program that provides a function and/or a process. Software 420 may include an operating system. Software 420 is also intended to include firmware, middleware, microcode, hardware description language (HDL), and/or other forms of instruction. Additionally, for example, end device 110 may include logic to perform tasks, as described herein, based on software 420.

Communication interface 425 permits device 400 to communicate with other devices, networks, systems, devices, and/or the like. Communication interface 425 includes one or multiple wireless interfaces and/or wired interfaces. For example, communication interface 425 may include one or multiple transmitters and receivers, or transceivers. Communication interface 425 may include one or more antennas. For example, communication interface 425 may include an array of antennas. Communication interface 425 may operate according to a protocol stack and a communication standard. Communication interface 425 may include various processing logic or circuitry (e.g., multiplexing/de-multiplexing, filtering, amplifying, converting, error correction, etc.).

Input 430 permits an input into device 400. For example, input 430 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 435 permits an output from device 400. For example, output 435 may include a speaker, a display, a light, an output port, and/or some other type of visual, auditory, tactile, etc., output component. According to some embodiments, input 430 and/or output 435 may be a device that is attachable to and removable from device 400.

Device 400 may perform a process and/or a function, as described herein, in response to processor 410 executing software 420 stored by memory/storage 415. By way of example, instructions may be read into memory/storage 415 from another memory/storage 415 (not shown) or read from another device (not shown) via communication interface 425. The instructions stored by memory/storage 415 cause processor 410 to perform a process described herein. Alternatively, for example, according to other implementations, device 400 performs a process described herein based on the execution of hardware (processor 410, etc.).

Figure 5A:
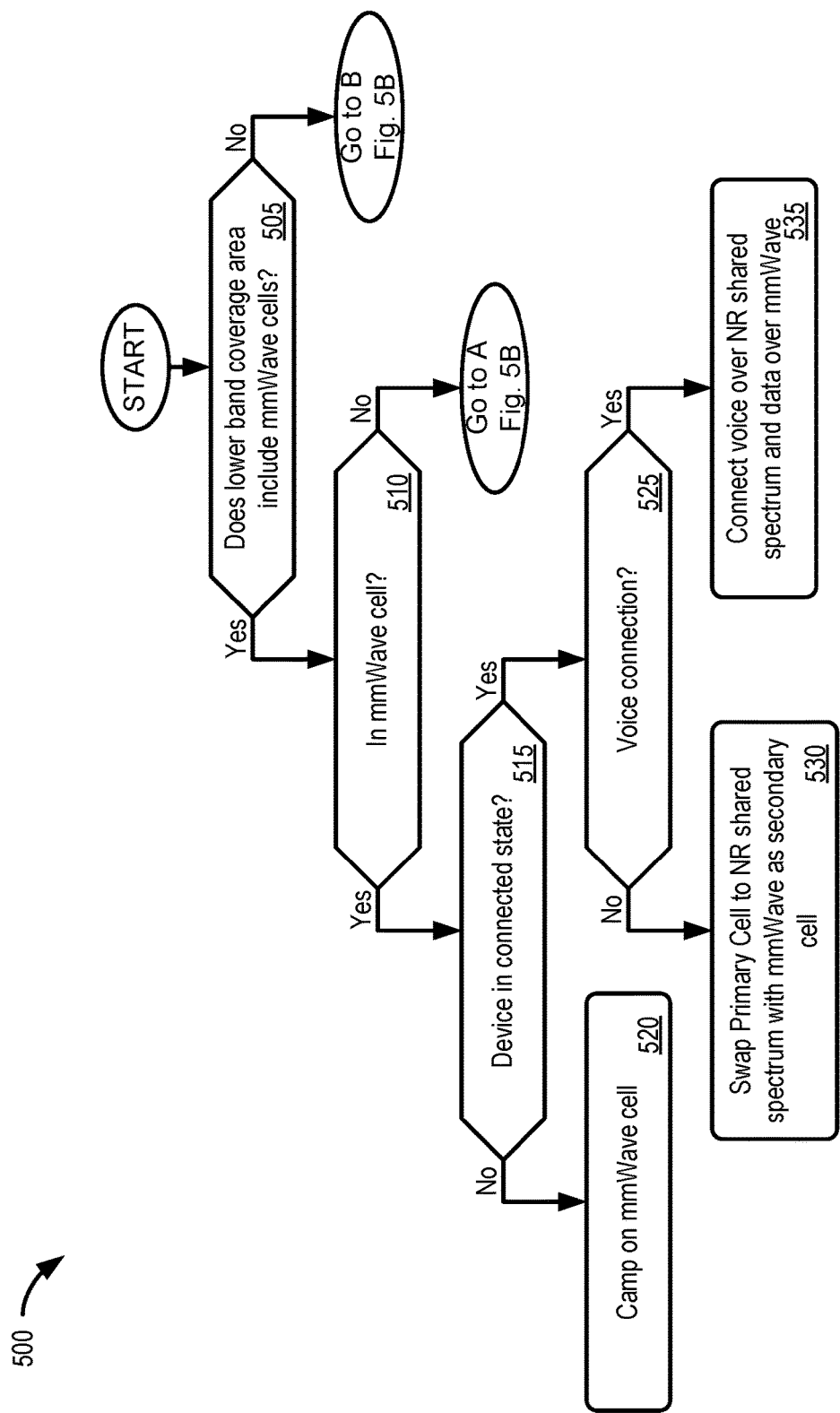
FIGS. 5A and B are a flow diagram illustrating an exemplary process for managing cell selection in a multi-RAT dual connectivity environment, according to an implementation described herein.
Figure 5B:
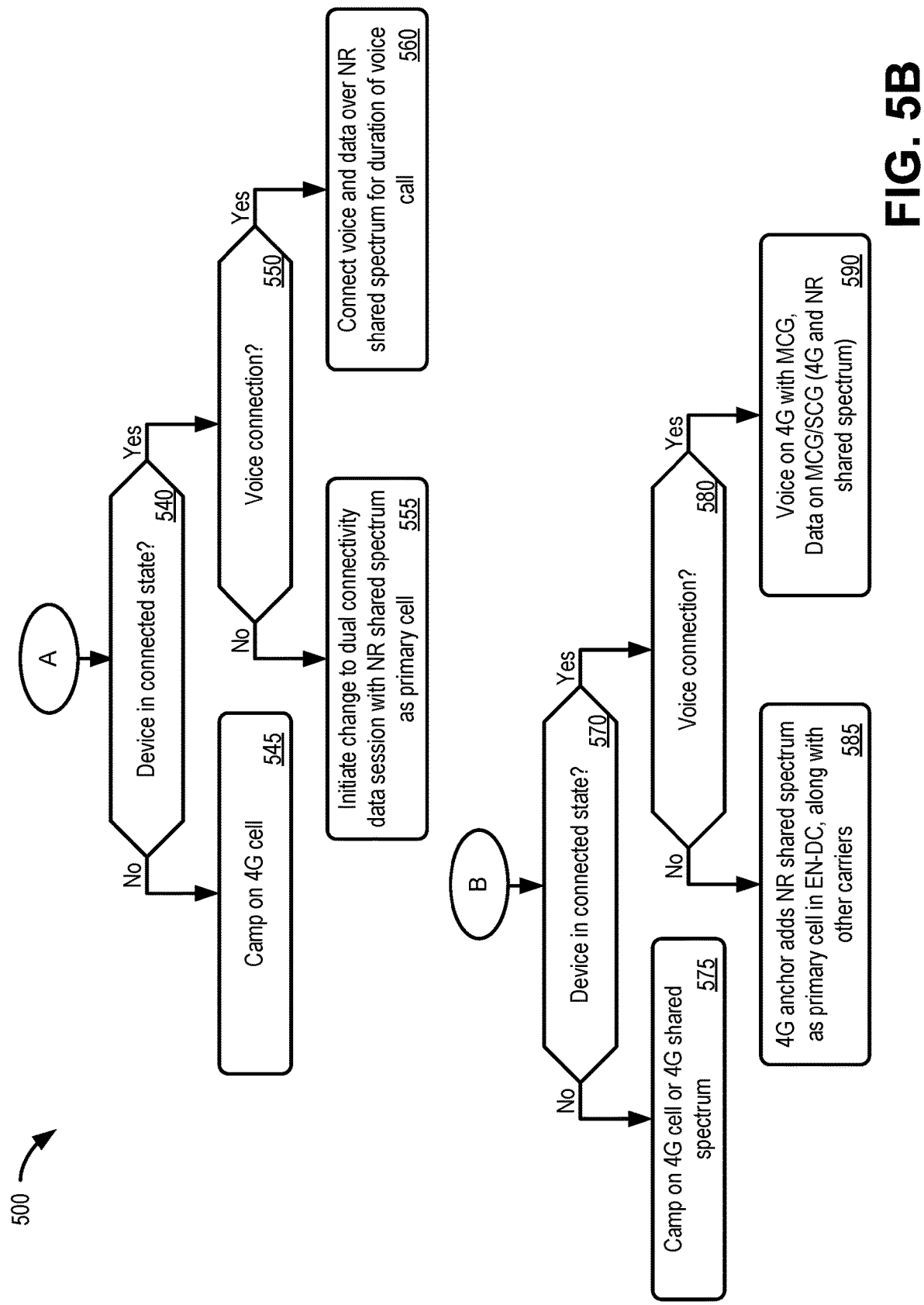

FIGS. 5A and 5B are a flow diagram illustrating an exemplary process 500 for managing cell selection in a multi-RAT dual connectivity environment, according to an implementation described herein. According to an exemplary embodiment, a wireless station (e.g., eNB/gNB 145) may perform steps of process 500. For example, processor 410 executes software 420 to perform the steps illustrated in FIGS. 5A and 5B, and described herein. In another embodiment, a wireless station may perform steps of process 500 in conjunction with one or more end devices, such as EN-DC UE 110.

Referring to FIG. 5A, it may be determined if the coverage area includes mmWave cells (block 505). For example, eNB/gNB 145 may determine from EPC network 150 and/or NGC network 170 if one or more mmWave gNB 135 is available within the cell of eNB/gNB 145 (e.g., coverage area 210).

If the coverage area does include mmWave cells (block 505—yes), it may be determined if the UE is in a mmWave cell (block 510). For example, EN-DC UE 110 may be located in the coverage area of mmWave gNB 135 (e.g., coverage area 220) and receive reference signals broadcast from mmWave gNB 135.

If the UE is currently in a mmWave cell (block 510—yes), the device state may be determined in block 515. If the device is not in a connected state (block 515—no), the UE may camp on the mmWave cell, as indicated in block 520. For example, when EN-DC UE 110 is in an idle mode within the coverage area of mmWave gNB 135 (e.g., coverage area 220), EN-DC UE 110 may monitor for paging and system signals from mmWave gNB 135.

If the device is in a connected state (block 515—yes), it may be determined if the connection includes a voice connection (block 525). For example, for outgoing voice calls EN-DC UE 110 may determine from an application if an RRC connection is for a voice call. Alternatively, for an incoming voice call, mmWave gNB 135 may receive an indication (e.g., from NGC core network 170) that a paging signal is for a voice connection.

If the connection does not include a voice connection (block 525—no), the primary cell may be swapped from mmWave to NR shared spectrum, as indicated in block 530. For example, EN-DC UE 110 may select wireless channel 194 for establishing eNB/gNB 145 as a primary cell and mmWave gNB 135 may be used as a secondary cell for dual connectivity.

If the connection does include a voice connection (block 525—yes), the voice connection may be established on the NR shared spectrum and concurrent data sessions may use the mmWave cell (block 535). For example, if EN-DC UE 110 initiates a voice call, EN-DC UE 110 may also initiate cell reselection to connect to a NR cell of eNB/gNB 145 for the voice call. Data sessions during the voice call may be routed through mmWave gNB 135 as the secondary cell.

Returning to block 510, if the UE is not in a mmWave cell (block 510—no), the device state may be determined in block 540 (FIG. 5B). If the device is not in a connected state (block 540—no), the device may camp on a 4G cell, as indicated in block 545. For example, EN-DC UE 110 may camp on a 4G frequency band serviced by eNB/gNB 145.

If the device is in a connected state (block 540—yes), it may be determined if the connection includes a voice connection (block 550). For example, for outgoing voice calls EN-DC UE 110 may determine from an application if an RRC connection is for a voice call. Alternatively, for an incoming voice call, eNB/gNB 145 may receive an indication (e.g., from EPC network 150) that a paging signal is for a voice connection.

If the connection does not include a voice connection (block 550—no), the 4G network may initiate a change to a dual connectivity data session with NR shared spectrum as the primary cell (block 555). For example, EPC network 150 may detect a data session through a 4G cell of eNB/gNB 145 and initiate a cell reselection for EN-DC UE 110 to connect to a shared spectrum NR band of eNB/gNB 145. Thus, EPC network 150 may trigger a change to both RAT and core network.

If the connection includes a voice connection (block 550—yes), both voice and data sessions may be sent over the NR shared spectrum for the duration of the voice call (block 560). For example, if EN-DC UE 110 initiates a voice call, EN-DC UE 110 may also initiate cell reselection to connect to a NR cell of eNB/gNB 145 for the voice call. Data sessions during the voice call may also be routed through the NR cell of eNB/gNB 145 to avoid a RAT change that would disrupt the voice call connection.

Returning to block 505 of FIG. 5A, if the coverage area does not include mmWave cells (block 505—no), the device state may be determined in block 570 (FIG. 5B). If the device is not in a connected state (block 570—no), the device may camp on a 4G cell or NR shared spectrum, as indicated in block 575. For example, EN-DC UE 110 may camp on a 4G frequency band serviced by eNB/gNB 145 or a NR frequency band serviced by eNB/gNB 145.

If the device is in a connected state (block 570—yes), it may be determined if the connection includes a voice connection (block 580). For example, for outgoing voice calls EN-DC UE 110 may determine from an application if an RRC connection is for a voice call. Alternatively, for an incoming voice call, eNB/gNB 145 may receive an indication (e.g., from NGC network 150) that a paging request is for a voice connection.

If the connection does not include a voice connection (block 580—no), the anchor cell may add the NR shared spectrum as the primary cell in an EN-DC scenario, along with other carriers (block 585). For example, for a data session, eNB/gNB 145 may detect a data session and initiate a cell reselection for EN-DC UE 110 to connect to a NR shared spectrum of eNB/gNB 145. eNB/gNB 145 may service as the primary node for dual connections using other carriers.

If the connection includes a voice connection (block 580—yes), both voice sessions may be sent over a 4G band and data session may use both the 4G and NR shared spectrum using MCG and SCG for the duration of the voice call (block 590). For example, if EN-DC UE 110 initiates a voice call, the 4G cell of eNB/gNB 145 will be used for the voice call. Data sessions during the voice call may also be routed through the 4G cell of eNB/gNB 145 as a MCG and a 5G cell of eNB/gNB 145 as a SCG.

FIG. 6 is a flow diagram illustrating an exemplary process 600 for enforcing cell selection to prioritize voice calls in a multi-RAT dual connectivity environment. According to an exemplary embodiment, a wireless station (e.g., eNB/gNB 145) may perform steps of process 600. For example, processor 410 executes software 420 to perform the steps illustrated in FIG. 6, and described herein. In another embodiment, a wireless station may perform steps of process 600 in conjunction with one or more end devices, such as EN-DC UE 110.

Referring to FIG. 6, process 600 may include broadcasting cell parameters barring end devices in idle mode from camping on an NR shared spectrum (block 610). For example, eNB/gNB 145 may broadcast a MIB over the NR shared spectrum that includes idle mode barring information for coverage area 210 on the NR shared spectrum.

Process 600 may further include broadcasting cell parameters to prioritize the end device to camp on a mmWave cell when the end device is within the coverage area of the mmWave cell, and to camp on 4G shared spectrum when the end device is not within the mmWave cell and is within the 4G shared spectrum cell (block 620). For example, eNB/gNB 145 may broadcast a MIB or SIB with priority for an mmWave cell (e.g., gNB 135) over 4G cells (e.g., 4G shared spectrum on eNB/gNB 145) for in idle mode camping.

Process 600 may additionally include triggering a swap from the mmWave spectrum to the NR shared spectrum when the end device enters an RRC connected mode, for a data session, in the mmWave coverage area (block 630). For example, when EN-DC UE 110 initiates a non-voice session, eNB/gNB 145 using NR shared spectrum may be automatically swapped to the primary node for EN-DC UE 110. Using dual connectivity, eNB/gNB 145 may add mmWave gNB 135 for higher throughput.

Process 600 may further include triggering a swap to the NR shared spectrum when the wireless station identifies a page for a voice call to the end device (block 640) and triggering a swap to the NR shared spectrum when the end device initiates a voice call (block 650). For example, when a wireless station (e.g., eNB/gNB 145 or gNB 135) receives a page request for EN-DC UE 110, the wireless station may identify the purpose of the paging request as initiating a voice call and may initiate a switch from the current cell to the NR shared spectrum on eNB/gNB 145. In one implementation, the paging request may include a voice call indicator that may be identified by the wireless station. Similarly, when EN-DC UE 110 initiates a voice call when camped on mmWave gNB spectrum or 4G spectrum, EN-DC UE 110 may trigger a swap to NR shared spectrum on eNB/gNB 145.

Although FIG. 6 illustrates an exemplary process 600 for enforcing cell selection to prioritize voice calls, process 600 may include additional operations, fewer operations, and/or different operations than those illustrated in FIG. 6, and described herein.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIGS. 5A, 5B, and 6, the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 410, etc.), or a combination of hardware and software (e.g., software 420).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 410) of a device. A non-transitory storage medium includes one or more of the storage mediums described in relation to memory/storage 415.

To the extent the aforementioned embodiments collect, store or employ personal information provided by individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims. No claim element of a claim is to be interpreted under 35 U.S.C. § 112(f) unless the claim element expressly includes the phrase "means for" or "step for."

What is claimed is:

1. A system comprising:
a first wireless station with a first coverage area, the first wireless station providing a shared spectrum of a first frequency band, the shared spectrum including a first spectrum and a second spectrum; and
a second wireless station with a second coverage area least partially within the first coverage area, the second wireless station providing a third spectrum of a second frequency band,
wherein the first wireless station is configured to broadcast a parameter barring an end device in an idle mode from camping on the second spectrum, wherein the parameter further includes cell selection priorities to:
cause the end device in the idle mode to camp on the third spectrum when the end device is within the second coverage area, and
allow the end device in the idle mode to camp on the first spectrum when the end device is not within the second coverage area and is within the first coverage area, and
wherein the first wireless station or the second wireless station is configured to trigger the end device to switch to the second spectrum when a paging request for a voice call to the end device is detected or when the end device initiates a voice call.

2. The system of claim 1, wherein the first wireless station is configured to provide a dynamic shared spectrum for the first spectrum, the second spectrum, or both the first spectrum and the second spectrum.

3. The system of claim 1, wherein the first spectrum is used in accordance with a Long Term Evolution (LTE) standard and wherein the second spectrum is used in accordance with a 5G New Radio standard.

4. The system of claim 1, wherein the third spectrum is a millimeter wave (mmWave) spectrum.

5. The system of claim 1, wherein the first wireless station provides for use of a static shared spectrum for a Fourth Generation (4G) standard and a Fifth Generation (5G) standard.

6. The system of claim 1, wherein the switch to the second spectrum changes a primary cell for the end device.

7. The system of claim 1, wherein the first wireless station is configured to bar use of the second spectrum for idle-camping but maintain availability for carrier aggregation or Evolved Universal Mobile Telecommunications System (UMTS) Terrestrial Radio Access (E-UTRA)—5G New Radio (NR) Dual Connectivity (EN-DC) functions.

8. The system of claim 1, wherein, when broadcasting the parameter, the first wireless station is configured to:
broadcast the parameter in a master information block (MIB).

9. The system of claim 1, wherein the first wireless station includes one of an eNodeB or a gNodeB.

10. A method, comprising:
providing, by a first wireless station with a first coverage area, a shared spectrum of a first frequency band, the shared spectrum including a first spectrum and a second spectrum;
providing, by a second wireless station with a second coverage area, a third spectrum for a second frequency band, the second coverage area being at least partially within the first coverage area;
broadcasting, by the first wireless station, a parameter barring an end device in an idle mode from camping on the second spectrum, wherein broadcasting the parameter includes broadcasting cell reselection priorities to:
cause the end device in the idle mode to camp on the third spectrum when the end device is within the second coverage area, and
allow the end device in the idle mode to camp on the first spectrum when the end device is not within the second coverage area and is within the first coverage area; and
triggering, by the first wireless station or the second wireless station, the end device to switch to the second spectrum when a paging request for a voice call to the end device is detected or when the end device initiates a voice call.

11. The method of claim 10, wherein the first spectrum is used in accordance with a Fourth Generation (4G) wireless standard, and wherein the second spectrum is used in accordance with a Fifth Generation (5G) wireless standard.

12. The method of claim 10, wherein the first wireless station provides a dynamic shared spectrum for the first spectrum, the second spectrum, or both the first spectrum and the second spectrum.

13. The method of claim 10, further comprising:
triggering, by the second wireless station, a switch from the second spectrum to the third spectrum when the end device enters a radio resource control (RRC) connected mode by initiating a data session while in the second coverage area.

14. The method of claim 10, wherein broadcasting the parameter further comprises:
broadcasting the parameter in a master information block (MIB) or a system information block (SIB).

15. The method of claim 10, wherein triggering the end device to switch to the second spectrum when a paging request for a voice call is detected comprises:
receiving the paging request, and
identifying a voice call indicator in the paging request.

16. The method of claim 10, wherein the end device is an Evolved Universal Mobile Telecommunications System (UMTS) Terrestrial Radio Access (E-UTRA)—5G New Radio (NR) Dual Connectivity (EN-DC)-capable device.

17. The method of claim 10, wherein the first wireless station includes one of an eNodeB or a gNodeB.

18. A non-transitory computer-readable medium storing instructions, which are executable by one or more processors, for:

providing, by a first wireless station with a first coverage area, a shared spectrum of a first frequency band, the shared spectrum including a first spectrum and a second spectrum;
providing, by a second wireless station with a second coverage area, a third spectrum for a second frequency band, the second coverage area being at least partially within the first coverage area;
broadcasting, by the first wireless station, a parameter barring an end device in an idle mode from camping on the second spectrum, wherein broadcasting the parameter includes broadcasting cell reselection priorities to:
cause the end device in the idle mode to camp on the third spectrum when the end device is within the second coverage area, and
allow the end device in the idle mode to camp on the first spectrum when the end device is not within the second coverage area and is within the first coverage area; and
triggering, by the first wireless station or the second wireless station, the end device to switch to the second spectrum when a paging request for a voice call to the end device is detected or when the end device initiates a voice call.

19. The non-transitory computer-readable medium of claim 18, further comprising instructions for:
triggering, by the second wireless station, a switch from the second spectrum to the third spectrum when the end device enters a radio resource control (RRC) connected mode by initiating a data session while in the second coverage area.

20. The non-transitory computer-readable medium of claim 18, wherein the first wireless station includes one of an eNodeB or a gNodeB.

* * * * *